United States Patent
Morin et al.

(10) Patent No.: US 7,353,561 B2
(45) Date of Patent: Apr. 8, 2008

(54) ARRANGEMENT FOR FIXING A WIPER DEVICE WHICH CAN BE USED TO RETRACT THE DRIVE SHAFT IN THE EVENT OF AN IMPACT

(75) Inventors: Pascal Morin, Châtellerault (FR); Joël Princet, Châtellerault (FR)

(73) Assignee: Valeo Systemes d'Essuyage, La Verriere (FR)

( * ) Notice: Subject to any disclaimer, the term of this patent is extended or adjusted under 35 U.S.C. 154(b) by 859 days.

(21) Appl. No.: 10/497,789

(22) PCT Filed: Dec. 4, 2002

(86) PCT No.: PCT/FR02/04186

§ 371 (c)(1),
(2), (4) Date: Jun. 7, 2004

(87) PCT Pub. No.: WO03/047926

PCT Pub. Date: Jun. 12, 2003

(65) Prior Publication Data

US 2005/0039290 A1    Feb. 24, 2005

(30) Foreign Application Priority Data

Dec. 7, 2001  (FR) .................................. 01 15886

(51) Int. Cl.
*B60S 1/02*  (2006.01)
*B60S 1/06*  (2006.01)

(52) U.S. Cl. ............. 15/250.31; 15/250.3; 403/DIG. 3; 403/24; 403/291; 403/224; 296/96.15; 296/96.17

(58) Field of Classification Search ............. 15/250.31, 15/250.3; 296/96.15, 96.17; 403/DIG. 3, 403/24, 291, 220, 224

See application file for complete search history.

(56) References Cited

U.S. PATENT DOCUMENTS

| 5,441,227 | A  |   | 8/1995 | Hayashi ...................... 248/274 |
| 6,216,309 | B1 |   | 4/2001 | Goto et al. ............. 15/250.31 |
| 6,532,616 | B1 | * | 3/2003 | Eustache ................. 15/250.31 |
| 6,899,370 | B2 | * | 5/2005 | Kalchschmidt et al. .. 296/96.15 |

\* cited by examiner

*Primary Examiner*—Gary K Graham
(74) *Attorney, Agent, or Firm*—Osha Liang LLP

(57) ABSTRACT

An arrangement for fixing a wiper device for a motor vehicle includes at least one stand for guiding and fixing a drive shaft that extends axially in a substantially vertical direction. The stand includes a barrel in which the shaft is guided in rotation, and a horizontal base plate for fixing the stand to a structural element of the vehicle, by a damper block made of an elastically deformable material. The damper block is fixed to the structural element by a fixing element, which includes a vertical rod that passes through the damper block and is connected to the structural element, and an element for locking the damper block on the structural element. The rod and locking element are connected by connection means for enabling the rod and locking element to disconnect, through downward sliding of the locking element with respect to the rod, when subjected to a violent impact.

10 Claims, 4 Drawing Sheets

ARRANGEMENT FOR FIXING A WIPER DEVICE WHICH CAN BE USED TO RETRACT THE DRIVE SHAFT IN THE EVENT OF AN IMPACT

CROSS-REFERENCE TO RELATED APPLICATIONS

This application is a national stage application based on International Application No. PCT/FR02/04186 filed Dec. 4, 2002.

FIELD OF THE INVENTION

The invention concerns an arrangement for fixing a wiping device for a motor vehicle.

BACKGROUND OF THE INVENTION

The invention concerns more particularly an arrangement for fixing a wiping device for a motor vehicle, of the type comprising at least one stand for guiding in rotation and fixing a drive shaft which extends axially in a substantially vertical direction, of the type in which the stand comprises a barrel in which the shaft is guided in rotation, and a horizontal base plate for fixing the stand with a body structure element of the vehicle, by means of a damper block made from elastically deformable material, of the type in which the damper block is fixed to the body structure element by a fixing element comprising a vertical rod which passes through the damper block and which is connected to the body structure element, and an element for the vertical locking of the damper block in the fixed position on the body structure element.

Such a stand constitutes a conventional mechanism for fixing the wiping device to the vehicle body.

In the event of collision of the vehicle with a pedestrian, the part of the wiper mechanism which extends outside the vehicle constitutes a blunt object which may cause injuries.

It has also been remarked that, in the case of violent accident, the wiping device, which is arranged in the engine compartment close to the cabin, could penetrate inside the cabin through the windscreen opening under the effect of the impact.

The accidental intrusion of an element as solid as this then proves to be dangerous to the safety of the passengers and it has therefore appeared necessary to better predict the behaviour of the wiper device in the event of violent impact.

The existence of means allowing retraction of the stand, in particular in the document FR-A-2.733.474, is known, in which the stand comprises a rupture initiation area, and in the document EP-A-0.916.559, in which the drive shaft retracts axially into the guide barrel.

However, these solutions have recourse to parts with complex shapes or additional parts. It is then no longer possible to use standard parts and the result is an additional cost during manufacture.

SUMMARY OF THE INVENTION

The aim of the invention is to propose a stand allowing retraction of the drive shaft in the event of axial impact, and which uses standard parts.

To this end, the invention proposes an arrangement of the type described previously, characterised in that the rod and locking element are connected by connection means enabling the rod and locking element to be disconnected, through a substantially vertical downward sliding of the locking element with respect to the rod, when the wiping device is subjected to a violent impact whose vertical component is oriented downwards and is greater than a given value, thus allowing separation by a vertical downward sliding of the damper block with the body structure element, in order to obtain axial retraction of the base plate, guide barrel and drive shaft.

According to other characteristics of the invention:

the connection means comprise at least one elastically deformable element;

the connection means comprise at least one element for retaining the locking element which is attached to the rod and which is able to disconnect from the rod at the time of impact;

the connection means comprise at least two lugs able to deform radially outwards received by the bottom end of the locking element, and whose substantially vertical internal faces cooperate with the wall of the rod for the connection of the locking element with the rod;

the connection means comprise at least one plastically deformable element;

the rod comprises, close to its bottom end, at least one lug curved towards the outside which is in abutment against a bottom face of the locking element;

the locking element comprises a tubular and/or cylindrical sleeve extending substantially vertically which has the rod pass through it, the internal wall of the tubular sleeve and the external wall of the rod being connected by cooperation of complementary shapes;

the connection means comprise at least one rupture initiation area;

the locking element and the rod are two parts of the same fixing element, and the rod is connected to the locking element by the rupture initiation area;

the locking element is connected to the rod by an intermediate element, and the locking element is connected to the intermediate element by the rupture initiation area.

BRIEF DESCRIPTION OF THE DRAWINGS

Other characteristics and advantages of the invention will emerge from a reading of the following detailed description, for an understanding of which reference will be made to the accompanying drawings, in which.

DETAILED DESCRIPTION

In the description which follows, identical, similar or analogous elements will be designated by the same reference numbers.

Figure 1:
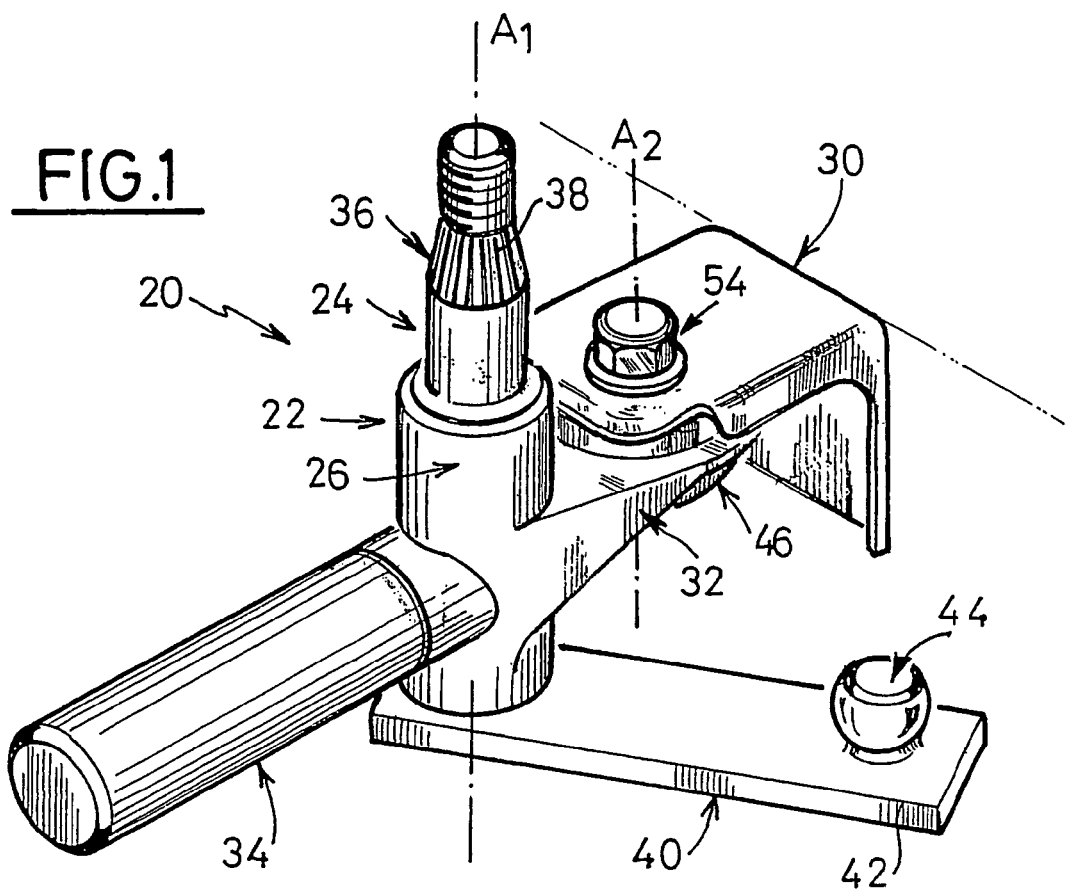
FIG. 1 is a perspective view of part of the wiping device according to the teachings of the invention.
Figure 2:
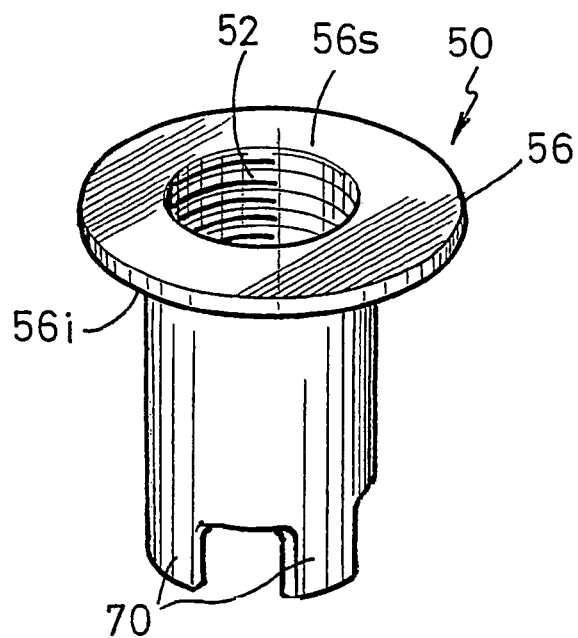
FIG. 2 is a perspective view of a rod of the element for fixing the wiping device according to the teachings of the invention.
Figure 3:
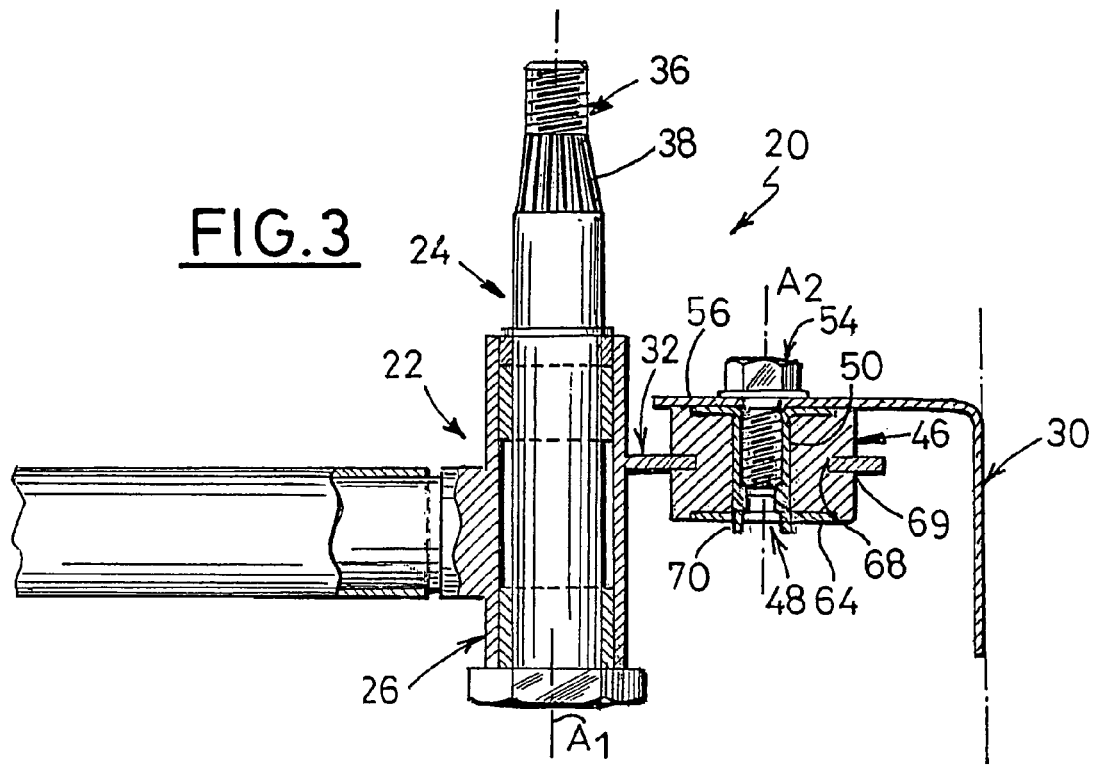
FIG. 3 is a view in longitudinal axial section of the wiper device of FIG. 1 through a plane passing through the vertical axes of the shaft and damper block.
Figure 4:
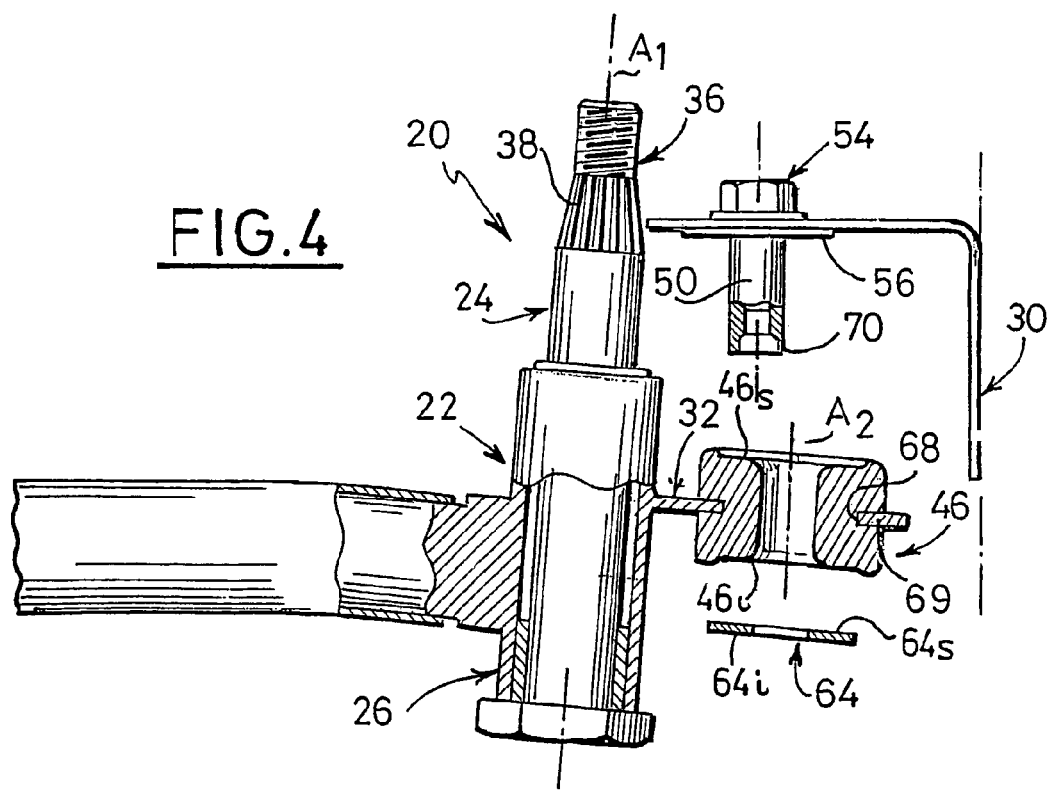
FIG. 4 is a view similar to that of FIG. 3 on which the guide stand and drive shaft are shown retracted after an impact.
Figure 5:
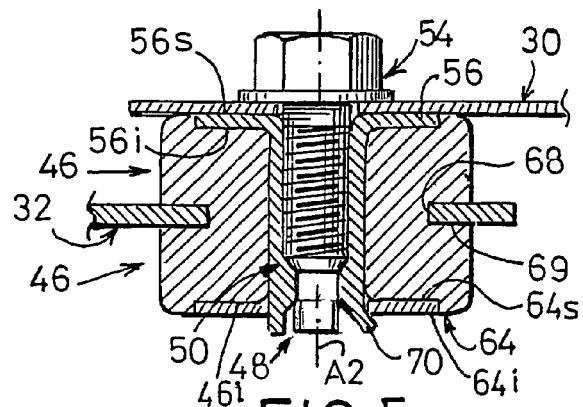
FIG. 5 depicts, in axial longitudinal section and to a larger scale, the detailed embodiment of the damper block and fixing element according to the invention.

FIGS. 1, 2 and 3 depict a wiper device 20 for a motor vehicle window (not shown) which comprises a stand 22, and a shaft 24 for driving a wiper arm (not shown).

The stand 22 allows the guidance in rotation and fixing of the shaft 24. It comprises a tubular barrel 26 of vertical axis A1 which is designed to receive, for rotation about its axis A1, the shaft 24.

By way of non-limiting example, the axis A1 is here oriented vertically.

For fixing it to a body structure element 30 of the vehicle, the stand 22 comprises a base plate 32 which extends substantially horizontally from the barrel 26, that is to say in a plane perpendicular to the axis A1.

The stand 22 also comprises a stub 34 which extends horizontally from the barrel 26 and which serves for connecting the stand 22 to the drive system (not shown) of the wiper device 20.

The top end 36 of the shaft 24 projects axially outward beyond the top end of the barrel 26 so as to enable the wiper to be mounted on a conical bearing surface 38, in this case notched, against which the wiper is intended to be clamped axially by a nut (not shown) screwed onto the free top end threaded portion 36 of the shaft 24.

To allow the rotational driving of the shaft 24, a crank 40 is provided which is mounted so as to be rotationally integral with the bottom end of the shaft 24, substantially perpendicular to the axis A1 of the shaft 26.

For its connection with a control linkage (not shown), itself driven by a geared motor (not shown), the crank 40 has, at its free longitudinal end 40 opposite to its end for fixing to the shaft 24, a spherical swivel 44 which is intended to be received in a housing of complementary shape (not shown) carried by the linkage.

According to a generally known design, particularly in order to damp vibrations, the base plate 32 is fixed to the body structure element 30 by means of a damper block 46 which is for example a block of cylindrical shape overall made from elastomer material.

The damper block 46 extends along a vertical axis A2 substantially parallel to the axis A1 of the shaft 24.

It is known how to produce the block 46 in the form of an element made from elastomer material moulded on around a central fixing element 48. The fixing element 48 comprises a tubular rod 50 with an annular cross-section which passes axially through the damper block 46.

The tubular rod 50 comprises a top thread 52 which receives a screw 54 for fixing the rod 50 to the body structure element 30. The rod 50 also comprises a horizontal top collar 56 whose bottom face 56i is in abutment against a top face 46s of the block 46 and whose top face 56s is in abutment on a bottom face of the body structure element 30, under the clamping action of the screw 54.

The fixing element 48 also comprises a locking element 64 which makes it possible to fix the block 46 to the fixing element 48. The locking element 64 is in general a horizontal washer whose top face 64s is in abutment against a bottom face 46i of the block 46, and which is connected to the rod 50 by connection means.

Thus the block 46 is fixed vertically between the collar 56 of the rod 50, and the locking element 64, the axial mounting preferably being clamped.

The block 46 is mounted in a complementary housing 68 in the base plate 32. More precisely, the housing 68 is a hole with a circular contour whose dimensions correspond to those of a groove 69 formed in the lateral cylindrical wall of the damper block 46.

In accordance with the teachings of the invention, the connection means between the locking element 64 and the rod 50 enable the locking element 64 and the rod 50 to be disconnected in the event of violent impact, in particular in the event of collision with a pedestrian. This disconnection thus enables the block 46 to slide vertically downwards with respect to the rod 50. Thus the rod 46 can be disconnected from the fixing element 48, which makes it possible to obtain axial retraction of the base plate 32, the barrel 26 and the drive shaft 24.

However, disconnection is possible only with an impact oriented downwards, that is to say which comprises a vertical component oriented downwards.

According to a first embodiment of the invention depicted in FIGS. 2 to 5, the bottom end of the rod 50 comprises lugs 70 which are curved radially outwards and crimped so as to be in abutment against the bottom face 64i of the locking element 64 (FIG. 5), thus forming the connection means.

The lugs 70 are sized so that, in the event of a violent impact, they deform plastically and/or break, so as to come into axial alignment with the rod 50. Thus the lugs 70 no longer hold the locking element 64, which can then disconnect from the rod 50.

Figure 8:
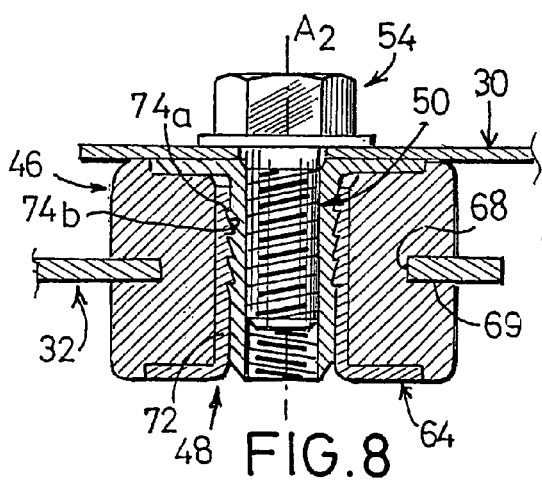
FIGS. 8 to 12 are views similar to those of FIG. 6, depicting five other embodiments of the fixing element, in accordance with the invention.

FIG. 8 depicts another embodiment of the invention according to which the connection means deform plastically at the time of impact.

The locking element 64 comprises a tubular sleeve 72 which extends vertically upwards passing through the block 46, and which has the rod 50 pass through it. The means of connection between the rod 50 and the locking element 64 are shapes in relief 74a arranged on the convex external face of the rod 50 which cooperate with complementary shapes 74b on the internal face of the tubular sleeve 72.

Here the complementary shapes in relief 74a, 74b are in the form of superimposed annular cams. They can however be of any other shape, such as a knurling of the peripheral wall of the rod 50, or a male/female thread assembly of a nut and screw connection, one element of which is made from more malleable material than the other.

To allow the disconnection of the locking element 64, the dimensions and materials making up the complementary shapes 74a, 74b are chosen so as to deform at the time of impact. The tubular sleeve 72, and therefore the locking element 64, can then slide along the rod 50, until complete disconnection takes place.

Figure 6:
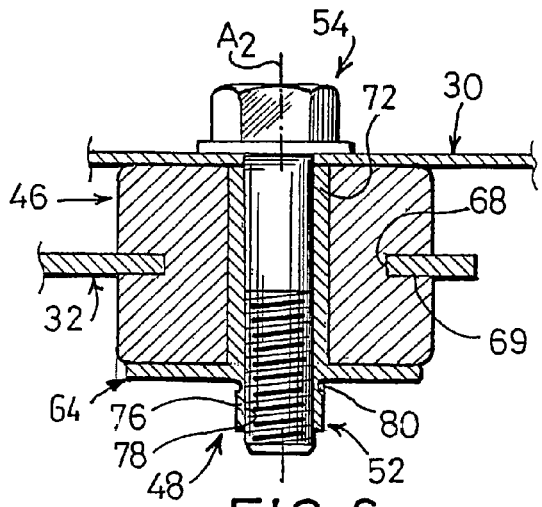
FIG. 6 is a view similar to that of FIG. 5, depicting a second embodiment of the fixing element, in accordance with the invention.
Figure 7:
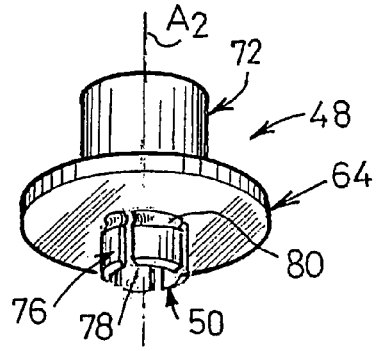
FIG. 7 is a perspective view of the locking element depicted in FIG. 6.
Figure 10:
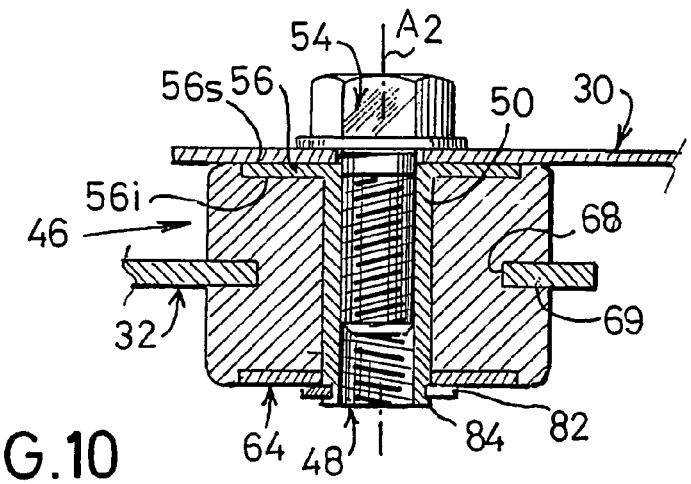

FIGS. 6, 7 and 10 depict two embodiments of the invention in which the connection means are elastically deformable.

According to the embodiment depicted in FIGS. 6 and 7, the rod 50 and the locking element 64 are two parts of the same fixing element 48.

The locking element 64 comprises a tubular sleeve 72 which extends vertically upwards passing through the block 46 and which has the fixing screw 54 pass through it. The rod 50 consists of lugs 76 which extend axially downwards from the bottom face of the locking element 64.

The internal faces 78 of the lugs 76 comprise a female thread which cooperates with the male thread on the fixing screw 54, thus affording the fixing of the locking element to the fixing screw 54. Each lug 76 comprises an area 80 of reduced thickness. The area of low elastic strength 80 thus formed enables the lugs 76 to move away radially towards the outside under the ramp effect exerted by the complementary threads at the time of impact, thereby allowing the disconnection of the locking element 64 from the fixing screw 54.

According to the embodiment depicted in FIG. 10, the connection means consist of an element 82 attached to the rod 50.

This attached element 82 is here a split elastic ring 82 which is received in a complementary groove 84 in the rod 50. This ring 82 makes it possible to stop the locking element 64 in vertical sliding towards the bottom.

An elastic ring 82 of the circlip type has been shown. However, it may be replaced by any elastic annular element such as for example a bracing ring of the "Grifaxe" type, or by a spring ring.

The dimensions and material of the ring 82, as well as the depth of the groove 84, are determined so that the ring 82 can emerge from the groove 84 at the time of impact, thus allowing the disconnection of the locking element 64.

Figure 9:
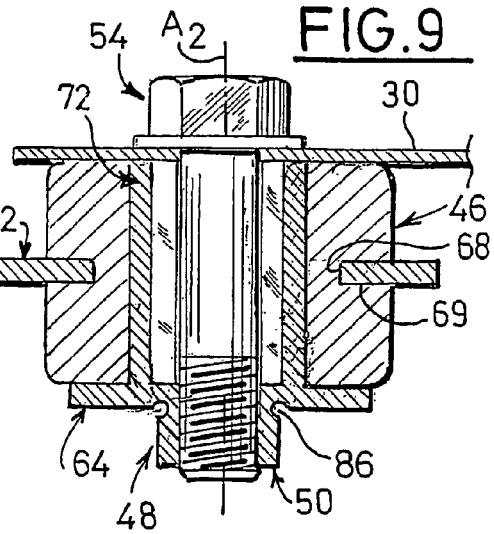
Figure 11:
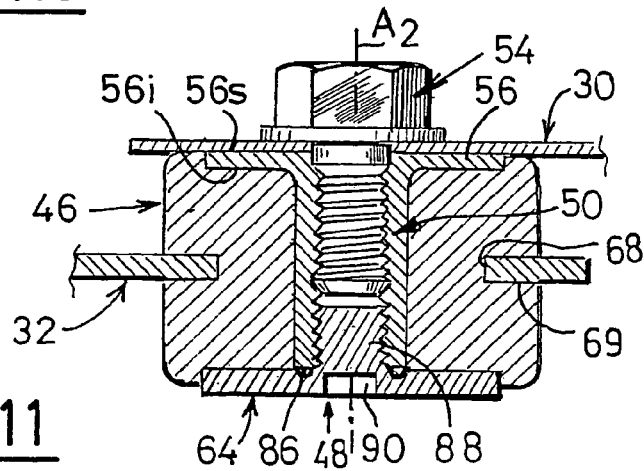

According to another variant of the invention depicted in FIGS. 9 and 11, the fixing means comprise a rupture initiation area 86.

According to the embodiment depicted in FIG. 9, the rod 50 and the locking element 64 are two parts of the same fixing element 48.

The locking element 64 comprises a tubular sleeve 72 which extends vertically upwards passing through the block 46, and which has the fixing screw 54 pass through it. The rod 50 is here a threaded tubular element which extends axially downwards from the bottom face 64*i* of the locking element 64.

The rod 50 is connected to the locking element 64 by the rupture initiation area 86, which has a cross-section sized so as to break at the time of impact, thus allowing the disconnection of the locking element 64.

According to the embodiment depicted in FIG. 11, the locking element 64 comprises a threaded element 88 which extends vertically upwards and whose male thread cooperates with the female thread of the rod 50 in order to effect the fixing of the locking element 54.

The threaded element is connected to the horizontal part of the locking element 64 by the rupture initiation area 86.

The cross-section of the rupture initiation area 86 is sized so as to break at the time of impact. Because of this, the horizontal part of the locking element 64 and the threaded element 88 disconnect, the threaded element remaining screwed in the rod 50, and thus allowing the disconnection of the locking element 64.

To allow the initial screwing of the locking element 64 into the rod 50, as well as the removal of the threaded element 88 after rupture, the locking element 64 comprises a shape 90 of the "hexagonal" type. This form 90 makes it possible to manoeuvre the locking element 64 and the threaded element 88 by means of a complementary screwing key (not shown).

Figure 12:
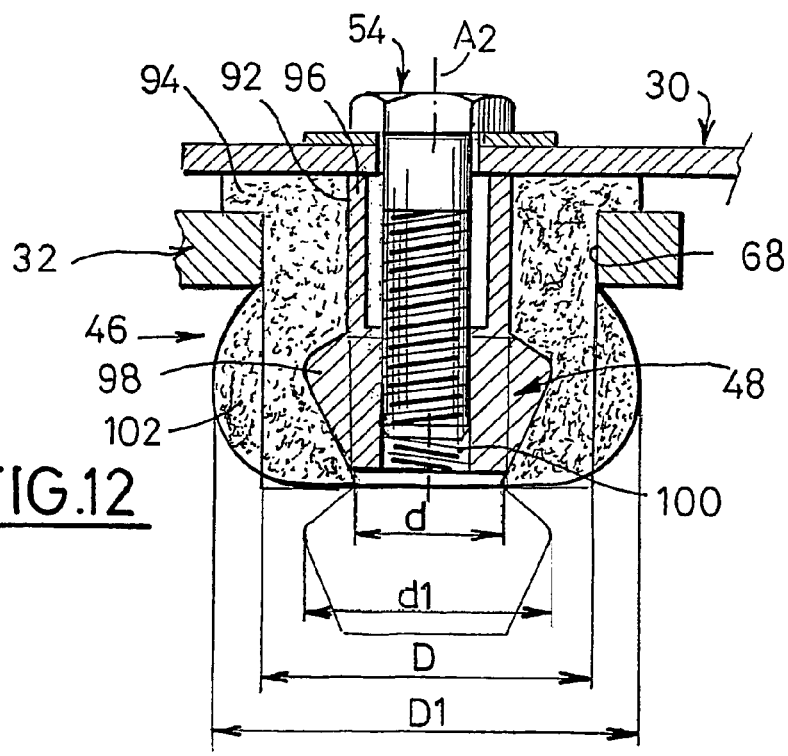

FIG. 12 depicts another embodiment of the invention which allows a separation of the base plate 32 from the body structure element 30.

Before it is fixed to the body structure element 30, as depicted in fine lines, the block 46 is cylindrical and tubular in shape, of vertical axis "A2" and with an outside diameter "D" substantially equal to the inside diameter of the housing 68 in the base plate 32. The block 46 also comprises a central axial hole 92 of diameter "d", and the top end of the block comprises an external radial shoulder 94.

The fixing element 48 comprises a tubular cylindrical top part 96 of vertical axis "A2" which passes through the hole 92 and has the fixing screw 54 pass through it. The top part 96 of the fixing element 48 is extended axially by a bottom part 98.

The bottom part 98 is a curved element of revolution, of vertical axis "A2" and with a diameter "d1" greater than the diameter "d" of the hole 92 in the block 46. The bottom part also comprises a thread 100 intended to receive the fixing screw 54.

When the wiping device 20 is in position mounted on the body structure element 30, the fixing element 48 is entirely engaged inside the block 46.

The bottom part 98 of the fixing element 48 has dimensions greater than the hole 92. Because of this, when it is progressively introduced into the block 46 under the screwing force, it causes a radial deformation of the block 46 and, because of the elasticity of the material of the block 46, a radial bulge 102 on the block 46 forms.

This radial bulge 102 has an outside diameter "D1" greater than the outside diameter "D" of the block 46 and therefore the diameter of the housing 68, which makes it possible to use the radial bulge 102 for the axial connection of the base plate 32 to the block 46.

The dimensions of the radial bulge 102, which depend on the inside "d" and outside "D" diameters of the block, and the dimensions of the bottom part 98 of the fixing element 48, as well as the material constituting the block 46, are determined so that the base plate 32 can be disconnected from the block 46 at the time of impact. Thus, at the time of impact, the base plate is pushed downwards and, because of the elasticity of the block 46, the force of the base plate 32 on the radial bulge 102 causes a deformation of the radial bulge 102 allowing axial sliding of the base plate 32 with respect to the block 46 and thus separation of the base plate 32 from the body structure element 30.

The elasticity of the block 46 can vary according to climatic conditions, in particular according to the outside temperature. Thus it may happen that, for certain conditions, the deformation of the bulge 102 requires that the magnitude of the impact be greater. This is unacceptable in the case of pedestrian impact.

To avoid this, the fixing element can comprise a rupture initiation area which is determined so as to rupture during an impact whose magnitude is greater than the magnitude of an impact for which the bulge 102 deforms under normal climatic conditions.

It will be understood that simple mechanical reversals may constitute variant embodiments of the invention. For example, the block 46 can be fixed to the base plate 32 by the fixing screw 54, and the body structure element 30 can be received in the groove 69 in the block 46.

The invention therefore allows the fixing of a wiping device 20 on a body structure element 30 which allows separation of these elements at the time of an impact. In addition this fixing is composed of a large number of standard elements, which makes it possible to reduce the manufacturing cost thereof.

What is claimed is:

1. An arrangement for fixing a wiping device for a motor vehicle, of the type comprising at least one stand for guiding in rotation and fixing a drive shaft which extends axially in a substantially vertical direction, of the type in which the stand comprises a barrel in which the shaft is guided in rotation, and a horizontal base plate for fixing the stand with a body structure element of the vehicle, by means of a damper block made from elastically deformable material, of the type in which the damper block is fixed to the body structure element by a fixing element comprising a vertical rod which passes through the damper block and which is connected to the body structure element, and a locking element for the vertical locking of the damper block in the fixed position on the body structure element, characterised in that the rod and locking element are connected by connection means enabling the rod and locking element to be disconnected, through a substantially vertical downward sliding of the locking element with respect to the rod, when the wiping device is subjected to a violent impact whose vertical component is oriented downwards and is greater than a given value.

2. The arrangement according to claim 1, characterised in that the connection means comprise at least one elastically deformable element.

3. The arrangement according to claim 2, characterised in that the connection means comprise at least one element for retaining the locking element which is attached to the rod and which is able to disconnect from the rod at the time of impact.

4. The arrangement according to claim 2, characterised in that the connection means comprise at least two lugs able to separate radially outwards received by the bottom end of the locking element, and whose substantially vertical internal faces cooperate with the wall of the rod for the connection of the locking element with the rod.

5. The arrangement according to claim 1, characterised in that the connection means comprise at least one plastically deformable element.

6. The arrangement according to the preceding claim, characterised in that the rod comprises, close to its bottom end, at least one lug curved towards the outside which is in abutment against a bottom face of the locking element.

7. The arrangement according to claim 5, characterised in that the locking element comprises a tubular and/or cylindrical sleeve extending substantially vertical which has the rod pass through it, the internal wall of the tubular sleeve and the external wall of the rod (50) being connected by cooperation of complementary shapes (74*a*, 74*b*).

8. The arrangement according to claim 1, characterised in that the connection means comprise at least one rupture initiation area.

9. The arrangement according to the preceding claim, characterised in that the locking element (64) and the rod (50) are two parts of the same fixing element (48), and in that the rod (50) is connected to the locking element (64) by the rupture initiation area (86).

10. The arrangement according to claim 8, characterised in that the locking element is connected to the rod by an intermediate element, and in that the locking element is connected to the intermediate element by the rupture initiation area.

* * * * *